United States Patent Office

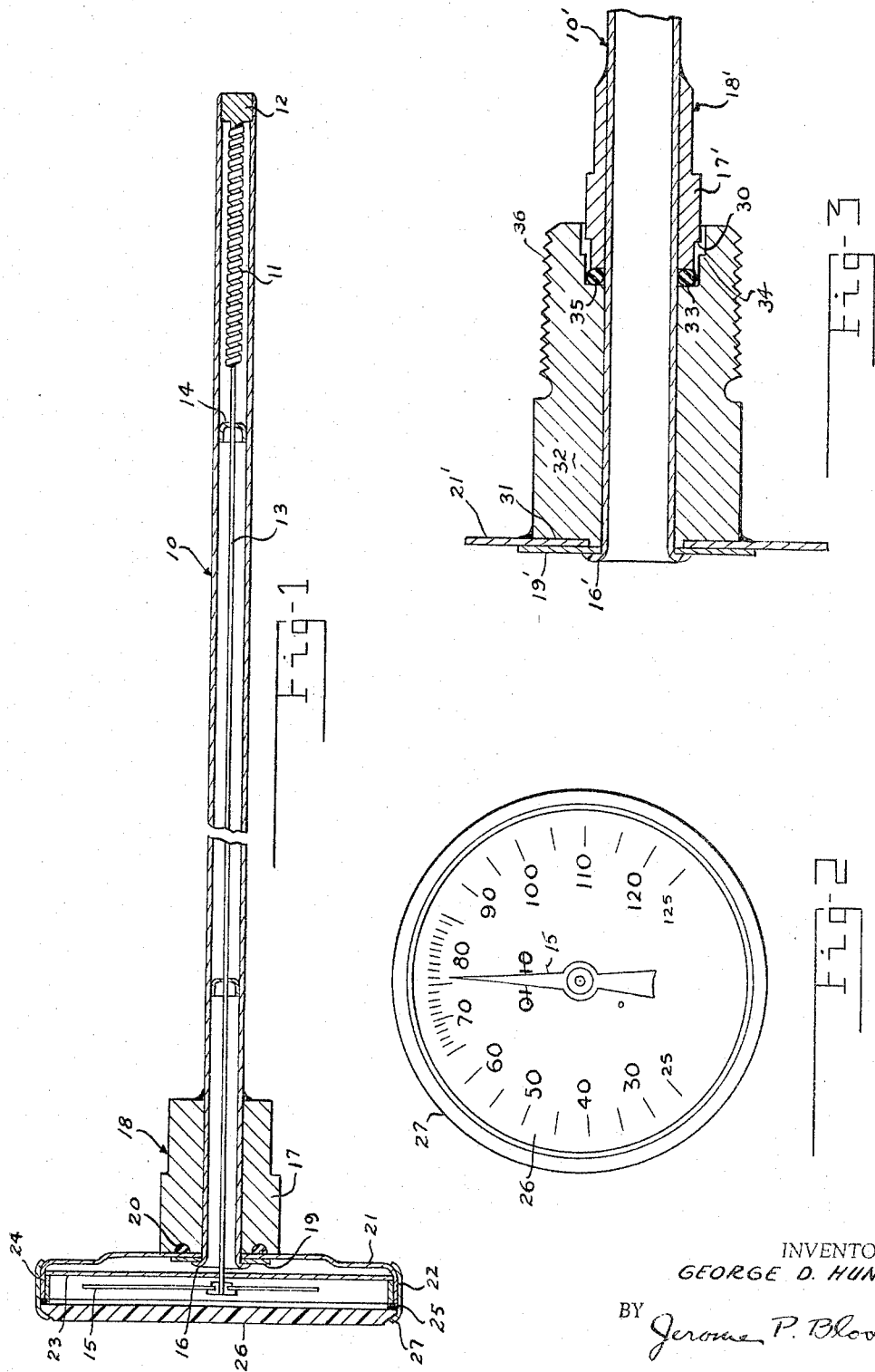

3,279,257
Patented Oct. 18, 1966

3,279,257
ADJUSTABLE THERMOMETER
George D. Hunt, Springfield, Ohio, assignor to The Ohio Thermometer Company, Springfield Ohio, a corporation of Ohio
Filed Oct. 7, 1963, Ser. No. 314,455
3 Claims. (Cl. 73—363.9)

This invention relates to thermometers and more particularly to improvements therein which facilitate their correction or recalibration, both in the factory and in the field.

It will be illustrated with reference to specific embodiments such as employed in bulk milk tanks. However, it should be obvious therefrom that neither its application nor the form of its embodiment need be so limited.

A primary object of the invention is to provide a thermometer which is economical to fabricate, more efficient and satisfactory in use and adaptable to a wide variety of application.

Another object of the invention is to provide a simple means for adjusting or recalibrating a thermometer.

A further object of the invention is to provide a thermometer which is so housed as to facilitate a correction of its indicated temperatures.

An additional object of the invention is to provide a recalibration type thermometer possessing the advantageous structural features, the inherent meritorious characteristics, and the means and mode of adjustment herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing, wherein is shown one but obviously not necessarily the only form of embodiment of the invention.

FIGURE 1 is a longitudinal cross-section view of a thermometer constituting a preferred embodiment of the present invention;

FIGURE 2 is the view of the head end of the thermometer of FIGURE 1; and

FIGURE 3 is a fragmentary sectional view illustrating a further embodiment of the present invention.

Like parts are indicated by similar characters of reference throughout the several views.

A preferred embodiment of the invention as illustrated in FIGURE 1 of the drawing reveals a thermometer including a hollow stem 10. Conventionally housed in one end of the stem, to extend a sense longitudinally thereof, is a bimetallic sensing element 11. One end of the element 11 is welded to a plug 12 which seals the adjacent end of the stem 10. Connected to the other end of the sensing element is a shaft 13. The shaft 13 extends through bearings 14 spaced longitudinally of the stem 10 to project exteriorly of the stem to its end remote from the plug 12. Suitably fixed at right angles to the projected extremity of the shaft 13 is a pointer 15.

To its end adjacent the pointer 15, the stem 10 includes an outwardly flared portion 16. Fixed about the stem to have one end thereof in adjacent and closely spaced relation to the flare 16 is a sleeve or hub 17 including diametrically opposed flats 18 on the exterior thereof and to its end remote from the flare 16. Also mounted about the stem 10 to have one face thereof abut the flare 16 is a bearing washer 19. Fixed in the end surface of the sleeve 17 directly opposite the washer 19 is a rubber-like O-ring 20.

A centrally apertured dish-shaped receptacle 21 mounts about the stem 10 to have its inner peripheral portion clamped between the washer 19 and the O ring 20 on the adjacent end of the sleeve 17. Such portion, forming the base of the receptacle is thus confined to a longitudinal position of frictional engagement as described, being prevented by flare 16 and washer 19 from retracting from the end surface of sleeve 17. The outer edge of the dish-shaped receptacle 21 is defined by a cylindrically formed, axially projected wall 22. The base of the receptacle 21 immediately about the stem 10 is centrally dished in a sense opposite to the projection of the wall 22. The wall 22 is bridged immediately adjacent to its dished base by a dial plate 23 which is centrally apertured to accommodate the projection therethrough of the shaft 13 which positions the pointer 15 in a plane generally parallel to the outer face of the dial plate 23. As seen in FIGURE 2 of the drawings, the plate 23 is provided with suitable calibrations with which the pointer 15 might register and so indicate the existent temperature in the environment within which the stem 10 might be placed.

Rimming the outer edge of the outer face of the plate 23 is a ring type spacer element 24, the outer surface of which abuts and extends co-extensively with the inner surface of the receptacle wall 22. Overlying the projected edges of the wall 22 and the spacer 24 is a gasket 25. Superposed on the gasket 25 to bridge the opening to the receptacle 21 is a Plexiglas transparent cover 26, the outer face of which is bevelled at its outer edge.

The assembly including the receptacle 21, the dial plate 23, ring member 24, gasket 25, and cover 26, is established in a unitary fixed relation by a bezel element 27 which peripherally confines the aforementioned elements in a manner evidenced in FIG. 1 of the drawings. This structure forms an enclosure for the projected extremity of the shaft 13 and the pointer thereon, the latter of which is originally established in a predetermined position referenced to the calibrations on the dial plate 23 in any suitable fashion.

As may be seen, the dial plate 23 forms an integral part of the receptacle or case 21 which is capped by a cover plate 26.

A base portion of the receptacle or case 21 is confined between washer 19 and the O-ring 20 in a manner to normally establish the case 21 and its connected elements in a relatively fixed relation to the stem 10. However, in the event that it is necessary to recalibrate the thermometer as so provided, the stem 10 may be held in a fixed position by application of a suitable clamp to the flats 18 on its sleeve 17. One may then manually turn the dial and its connected case structure against the frictional drag of the confining O-ring 20. The operation is exceedingly simple. It involves no otherwise moving parts.

It may therefore be seen that a simple twist of the case 21 relative the stem assembly will produce an adjustment of the dial in reference to the pointer 15. This procedure enables a simple thermometer adjustment which insures that its readings will be precise and accurate.

Thus, in accordance with the present invention one may achieve a recalibration type thermometer by a very simple and economical method of fabrication. Further, one may adjust such a thermometer with a minimum of effort, whether in the factory or in the field. The mechanism by which the adjustment may be achieved in accordance with the invention is in distinct contrast to the more complex structure utilized in prior art devices of a similar nature.

FIG. 3 of the drawings shows a modification of the device of FIGS. 1 and 2, to provide a second embodiment of the invention. In this instance only so much of the device is shown as appears necessary to provide a distinction thereof from the embodiment first described, like parts being identified by like numerals.

In this case the stem 10′ is the same as that first described. Incorporated on the one end thereof is a flared portion 16′. Positioned about the stem with one face in abutment with the flare 16′ is a washer 19′. The stem 10′ accommodates a sensing unit as shown in FIGS. 1 and 2, this unit including the bimetallic sensing strip 11 connected at one end to a plug 12 which seals the stem to one end remote from the flared end 16′. The other end of the strip 11 anchors to a shaft 13 which projects from the flared end of the stem to have its projected extremity mount a pointer 15 at right angles thereto and in a plane parallel to a dial plate 23 as shown in FIGS. 1 and 2. The case structure in which the dial 23 is fixed is identical to that described in the first instance. Beyond this point, however, the embodiment in FIG. 3 differs from that shown in FIGS. 1 and 2.

In this instance the stem 10′ mounts a sleeve 17′ which is fixed thereto in a position to have its end most adjacent to washer 19′ substantially spaced therefrom. On its outer surface, to its end most remote from the washer 19′, the sleeve 17′ incorporates diametrically opposed flats 18′. Further, the sleeve 17′ is reduced in external diameter to its end most adjacent the washer 19′ to form an intermediate shoulder 30 which orients in a plane generally parallel to that of the washer.

The inner peripheral portion of the base of the receptacle 21′ in this embodiment has one face portion thereof in bearing abutment to the washer 19′. In abutment with its opposite face is a shoulder 31 formed on one end of a sleeve 32. The sleeve 32 is welded to the receptacle 21′, about its outer periphery, to project therefrom, about and in bearing relation to the stem 10′. At its end remote from the receptacle 21′ the sleeve 31 is countersunk to provide it with an innermost shoulder 33 immediately about the stem 10 and an intermediate shoulder 34 spaced to its end remote from the receptacle. The shoulder 33 provides an abutment for an O-ring 35. The O-ring 35 is confined to the shoulder 33 by one end of the sleeve 17′ which is fixed to and about the stem 10′, which end nests interiorly of the countersunk portion of the adjacent end of the sleeve 32.

As may be seen, the sleeve 17′ is fixed to the stem 10′ and the sleeve 32 is fixed to the receptacle structure and bears therewith on washer 19 and stem 10′. The O-ring 35 forms a frictional connection between the sleeves 17′ and 32, to normally inhibit a relative rotational movement therebetween. For this reason, the pointer 15 will normally have a fixed reference pattern in relation to the calibrations on the dial 23. However, as indicated in the first described embodiment of the invention, this structure does provide for a relative rotation of the sleeve 32 in respect to the stem 10′. This rotation may be accomplished by applying a suitable clamp to the flats 18′ on the sleeve 17′ to fix the position of the stem 10′ and grasping and relatively turning the entire dial case structure on the stem 10′ in a manner believed obvious. By these means, one may achieve the required relative position of the included pointer in reference to the calibrated dial. Thus, in all instances, it is a very simple procedure to insure that the temperature indicated on the thermometer unit of the invention is accurate and precise.

In summary, in either embodiment of the invention, one may readily adjust the relative position of the calibrations on the included dial with respect to the indicator means and thereby produce the desired results.

The embodiment of FIG. 3 also includes, external to the sleeve 32, a thread 36 by means of which the thermometer unit may be threadedly engaged through threaded aperture in a housing structure so as to have the sensing portion thereof depend in its interior for purposes believed obvious.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention I claim:

1. A thermometer, including a tubular stem closed at one end and open at the other end, means in said stem responsive to temperature change, a shaft connected at one end to said last named means and extending through said stem to the other end thereof, the other end of said shaft being in a projected relation to said stem, a pointer on the projected other end of said shaft, a dial case in surrounding relation to said pointer having a base in transverse relation to the axis of said stem and apertured to receive said other end of said stem, said base having a relatively rotatable bearing on said stem, a hub fixed to the said other end of said stem and having a planar end in parallel adjacent relation to said base of said case, said base being intermediate the said other end of said stem and said planar end of said hub, resilient deformable O-ring means interposed between the planar end of said hub and the base of said case, said case occupying a longitudinal position with its base in frictional engagement with the planar end of said hub compressing said O-ring means, and peripheral abutment means on the said other end of said stem projecting reversely thereof toward said hub positively confining said case to said longitudinal position.

2. A thermometer according to claim 1, characterized in that the extremity of said other end of said stem is flared outwardly to form an integral limiting abutment which precludes retracting motion of said stem relative to said case.

3. A thermometer, including a tubular stem closed at one end and open at the other end, means in said stem responsive to temperature change, a shaft connected at one end to said last named means and extending through said stem to the other end thereof, the other end of said shaft being in a projected relation to said stem, a pointer on the projected other end of said shaft, a dial case in surrounding relation to said pointer having a base in transverse relation to the axis of said stem and apertured to receive said other end of said stem, said base having a relatively rotatable bearing on said stem, a hub fixed to the said other end of said stem and having a planar end in parallel adjacent relation to said base of said case, said base being intermediate the said other end of said stem and said planar end of said hub, resilient deformable O-ring means interposed between the planar end of said hub and the base of said case, means on the said other end of said stem fixing said case in a longitudinal position compressing said O-ring means, and a sleeve disposed about the said outer end of said stem and secured to the base of said case, said sleeve achieving a telescoping relation with said hub and said O-ring means being interposed between said planar end on said hub and a corresponding surface on said sleeve.

References Cited by the Examiner

UNITED STATES PATENTS

| 1,429,975 | 9/1922 | Roth et al | 73—363.9 |
| 2,988,041 | 6/1961 | Schmitz et al. | 73—363.7 |
| 3,122,018 | 2/1964 | Freeman et al. | 73—363.7 |

FOREIGN PATENTS 204,271   6/1938   Switzerland.

LOUIS R. PRINCE, *Primary Examiner.*

D. M. YASICH, *Assistant Examiner.*